United States Patent
Kim et al.

(10) Patent No.: US 12,506,213 B2
(45) Date of Patent: Dec. 23, 2025

(54) BATTERY PACK PRESSURE REGULATION

(71) Applicant: GM Global Technology Operations LLC, Detroit, MI (US)

(72) Inventors: Wonhee Michael Kim, Royal Oak, MI (US); Hanho Yun, Oakland Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 726 days.

(21) Appl. No.: 17/933,649

(22) Filed: Sep. 20, 2022

(65) Prior Publication Data
US 2024/0097263 A1     Mar. 21, 2024

(51) Int. Cl.
*H01M 50/264* (2021.01)
*H01M 50/204* (2021.01)
*H01M 50/291* (2021.01)

(52) U.S. Cl.
CPC ....... *H01M 50/264* (2021.01); *H01M 50/204* (2021.01); *H01M 50/291* (2021.01); *H01M 2220/20* (2013.01)

(58) Field of Classification Search
CPC ............. H01M 50/264; H01M 50/204; H01M 50/291; H01M 2220/20; H01M 10/0481; Y02E 60/10
See application file for complete search history.

(56) References Cited

U.S. PATENT DOCUMENTS

| | | | | |
|---|---|---|---|---|
| 2003/0017387 A1* | 1/2003 | Marukawa | .......... | H01M 50/209 429/178 |
| 2014/0377633 A1* | 12/2014 | Kong | .................. | H01M 50/105 429/186 |
| 2022/0140430 A1* | 5/2022 | Tate | ..................... | H01M 50/209 429/163 |
| 2022/0212804 A1* | 7/2022 | Sarpotdar | ............... | B60L 50/60 |

FOREIGN PATENT DOCUMENTS

CN     207977389     * 10/2018     ............. Y02E 60/10

OTHER PUBLICATIONS

English Translation of CN207977389.*

* cited by examiner

*Primary Examiner* — Kiran Quraishi Akhtar
(74) *Attorney, Agent, or Firm* — Vivacqua Crane, PLLC (57) ABSTRACT

A battery includes a housing defining a sealed chamber, a battery pack positioned within the sealed chamber, and a shape memory alloy member that is adapted to axially compress the volume within the sealed chamber to pressurize the sealed chamber to an optimal pressure, and to automatically allow axial expansion of the volume of the sealed chamber in response to an increase of the pressure within the sealed chamber to maintain the pressure within the sealed chamber at the optimal pressure.

20 Claims, 4 Drawing Sheets

BATTERY PACK PRESSURE REGULATION

INTRODUCTION

The present disclosure relates to a system and method of controlling the pressure within a battery cell. Batteries, more specifically, lithium metal batteries, exhibit most favorable lifecycle performance when pressure within the battery cell is regulated at an optimal level. Battery cells with a rigid fixed housing experience extreme block stress, which also negatively impacts the lifecycle of the battery.

Thus, while current battery systems and methods achieve their intended purpose, there is a need for a new and improved battery and method wherein the pressure within the battery cell is maintained at an optimum level.

SUMMARY

According to several aspects of the present disclosure, a battery includes a housing defining a sealed chamber, and a battery pack positioned within the sealed chamber, wherein the housing is adapted to axially compress the sealed chamber to pressurize the sealed chamber to an optimal pressure, and to automatically allow axial expansion of the sealed chamber in response to an increase of the pressure within the sealed chamber to expand a volume of the sealed chamber and maintain the pressure within the sealed chamber at the optimal pressure.

According to another aspect, the housing further includes a first rigid plate positioned at a first axial end of the battery, and a second rigid plate positioned at a second axial end of the battery, the first and second rigid plates defining the sealed chamber therebetween, first and second interconnecting members extending axially between and interconnecting the first and second rigid plates, wherein the first and second rigid plates are moveable relative to one another axially along the first and second interconnecting members, and a compression spring positioned between a first end of each of the first and second interconnecting members and the first rigid plate, and adapted to bias the first rigid plate toward the second rigid plate.

According to another aspect, the housing further includes a compression spring positioned between a second end of each of the first and second interconnecting members and the second rigid plate, and adapted to bias the second rigid plate toward the first rigid plate.

According to another aspect, the compression springs positioned between the first end of each of the first and second interconnecting members and the first rigid plate and the compression springs positioned between the second end of each of the first and second interconnecting members and the second rigid plate are made from a shape memory alloy that biases the first and second rigid plates toward one another to axially compress the volume within the sealed chamber and pressurize the sealed chamber to the optimal pressure, and automatically allows axial expansion of the sealed chamber in response to an increase of the pressure within the sealed chamber to expand the volume of the sealed chamber and maintain the pressure within the sealed chamber at the optimal pressure.

According to another aspect, the housing further includes a first rigid plate positioned at a first axial end of the battery, and a second rigid plate positioned at a second axial end of the battery, the first and second rigid plates defining the sealed chamber therebetween, and first and second extension springs extending axially between and interconnecting the first and second rigid plates, and adapted to bias the first and second rigid plates toward one another.

According to another aspect, the first and second extension springs are made from a shape memory alloy that biases the first and second rigid plates toward one another to axially compress the volume within the sealed chamber and pressurize the sealed chamber to the optimal pressure, and automatically allows axial expansion of the sealed chamber in response to an increase of the pressure within the sealed chamber to expand the volume of the sealed chamber and maintain the pressure within the sealed chamber at the optimal pressure.

According to another aspect, the housing includes a first rigid plate positioned at a first axial end of the battery, and a second rigid plate positioned at a second axial end of the battery, and first, second, third and fourth walls extending axially between the first and second rigid plates, the first, second, third and fourth walls and the first and second rigid plates defining the sealed chamber, the first, second, third and fourth walls unitarily formed from a shape memory alloy that biases the first and second rigid plates toward one another to axially compress the volume within the sealed chamber and pressurize the sealed chamber to the optimal pressure, and automatically allows axial movement of the first and second rigid plates away from one another in response to an increase of the pressure within the sealed chamber to expand the volume of the sealed chamber and maintain the pressure within the sealed chamber at the optimal pressure.

According to another aspect, the housing further includes a first rigid plate positioned at a first axial end of the battery, and a second rigid plate positioned at a second axial end of the battery, the first and second rigid plates defining the sealed chamber therebetween, and first and second interconnecting rods extending axially between and interconnecting the first and second rigid plates, the first and second interconnecting rods being made from a shape memory alloy that biases the first and second rigid plates toward one another to axially compress the volume within the sealed chamber and pressurize the sealed chamber to the optimal pressure, and automatically allows axial movement of the first and second rigid plates away from one another in response to an increase of pressure within the sealed chamber to expand a volume of the sealed chamber and maintain the pressure within the sealed chamber at the optimal pressure.

According to another aspect, the housing further includes a first rigid plate positioned adjacent a first axial end of the battery, and a second rigid plate positioned adjacent a second axial end of the battery, the first and second rigid plates defining the sealed chamber therebetween and being independently axially moveable between the first and second axial ends of the battery, and at least one compression member positioned between the first rigid plate and the first axial end of the housing and adapted to bias the first rigid plate toward the second axial end of the housing, and at least one compression member positioned between the second rigid plate and the second axial end of the housing and adapted to bias the second rigid plate toward the first axial end of the housing.

According to another aspect, the at least one compression member positioned between the first rigid plate and the first axial end of the housing and the at least one compression member positioned between the second rigid plate and the second axial end of the housing are made from a shape memory alloy that biases the first and second rigid plates toward one another to axially compress the volume within the sealed chamber and pressurize the sealed chamber to the optimal pressure, and automatically allows axial movement of the first and second rigid plates away from one another in response to an increase of the pressure within the sealed chamber to expand a volume of the sealed chamber and maintain the pressure within the sealed chamber at the optimal pressure, and each of the at least one compression member positioned between the first rigid plate and the first axial end of the housing and the at least one compression member positioned between the second rigid plate and the second axial end of the housing comprise one of a shape memory alloy tube, a shape memory alloy block, a shape memory alloy compression spring, and a shape memory alloy plate.

According to another aspect, the housing further includes a first compression plate positioned at a first axial end of the battery, and a second compression plate positioned at a second axial end of the battery, the first and second compression plates defining the sealed chamber therebetween, and the first and second compression plates being made from a shape memory alloy that axially compresses the volume within the sealed chamber and pressurizes the sealed chamber to the optimal pressure, and automatically compresses axially in response to an increase of pressure within the sealed chamber to expand a volume of the sealed chamber and maintain the pressure within the sealed chamber at the optimal pressure.

According to several aspects of the present disclosure, a battery includes a housing defining a sealed chamber, a battery pack positioned within the sealed chamber, and a shape memory alloy member that is adapted to axially compress a volume within the sealed chamber to pressurize the sealed chamber to an optimal pressure, and to automatically allow axial expansion of the volume of the sealed chamber in response to an increase of pressure within the sealed chamber to maintain the pressure within the sealed chamber at the optimal pressure.

According to another aspect, the housing further includes a first rigid plate positioned at a first axial end of the battery, and a second rigid plate positioned at a second axial end of the battery, the first and second rigid plates defining the sealed chamber therebetween, and first and second interconnecting members extending axially between and interconnecting the first and second rigid plates, wherein the first and second rigid plates are moveable relative to one another axially along the first and second interconnecting members, wherein, the shape memory alloy member includes a compression spring positioned between a first end of each of the first and second interconnecting members and the first rigid plate, and adapted to bias the first rigid plate toward the second rigid plate.

According to another aspect, the shape memory alloy member further includes a compression spring positioned between a second end of each of the first and second interconnecting members and the second rigid plate, and adapted to bias the second rigid plate toward the first rigid plate.

According to another aspect, the housing further includes a first rigid plate positioned at a first axial end of the battery, and a second rigid plate positioned at a second axial end of the battery, the first and second rigid plates defining the sealed chamber therebetween, wherein, the shape memory alloy member includes first and second extension springs extending axially between and interconnecting the first and second rigid plates, and adapted to bias the first and second rigid plates toward one another.

According to another aspect, the housing includes a first rigid plate positioned at a first axial end of the battery, and a second rigid plate positioned at a second axial end of the battery, wherein, the shape memory alloy member includes first, second, third and fourth walls, unitarily formed and extending axially between the first and second rigid plates, the first, second, third and fourth walls and the first and second rigid plates defining the sealed chamber.

According to another aspect, the housing further includes a first rigid plate positioned at a first axial end of the battery, and a second rigid plate positioned at a second axial end of the battery, the first and second rigid plates defining the sealed chamber therebetween, wherein, the shape memory alloy member includes first and second interconnecting rods extending axially between and interconnecting the first and second rigid plates.

According to another aspect, the housing further includes a first rigid plate positioned adjacent a first axial end of the battery, and a second rigid plate positioned adjacent a second axial end of the battery, the first and second rigid plates defining the sealed chamber therebetween and being independently axially moveable between the first and second axial ends of the battery, wherein, the shape memory alloy member includes at least one compression member positioned between the first rigid plate and the first axial end of the housing and adapted to bias the first rigid plate toward the second axial end of the housing, and at least one compression member positioned between the second rigid plate and the second axial end of the housing and adapted to bias the second rigid plate toward the first axial end of the housing.

According to another aspect, each of the at least one compression member positioned between the first rigid plate and the first axial end of the housing and the at least one compression member positioned between the second rigid plate and the second axial end of the housing comprise one of a shape memory alloy tube, a shape memory alloy block, a shape memory alloy compression spring, and a shape memory alloy plate.

According to another aspect, the shape memory alloy member includes a first compression plate positioned at a first axial end of the battery, and a second compression plate positioned at a second axial end of the battery, the first and second compression plates defining the sealed chamber therebetween.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

Figure 1:
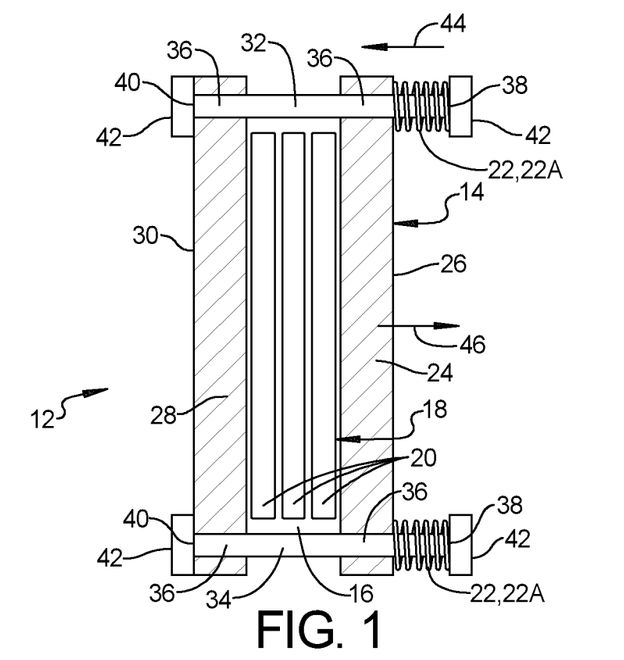
FIG. 1 is a schematic side view of a battery according to an exemplary embodiment, having compression springs made from a shape memory alloy.

Referring to FIG. 1, a battery 12 in accordance with embodiments of the present disclosure includes a housing 14 defining a sealed chamber 16 and a battery pack 18 positioned within the sealed chamber 16. The battery 12 may be a battery 12 for an electric or hybrid-electric vehicle. The battery pack 18 includes a plurality of battery cells 20. The housing 14 includes a shape memory alloy member 22 that is adapted to axially compress the volume within the sealed chamber 16 to pressurize the sealed chamber 16 to an optimal pressure, and to automatically allow axial expansion of the volume of the sealed chamber 16 in response to an increase of the pressure within the sealed chamber 16 to maintain the pressure within the sealed chamber 16 at the optimal pressure.

Using lithium metal to replace the graphite for battery anodes is an important goal within the battery R&D field. Lithium-metal batteries (LMBs) have the potential to double the capacity of today's best lithium-ion technologies. For example, lithium metal battery-powered electric vehicles would have twice the range of lithium-ion battery-powered vehicles, for the same battery weight.

Despite this advantage over lithium-ion batteries, LMBs have a relatively short lifespan and potential safety hazards, specifically short circuits caused by lithium dendrite growth. R has been discovered that subjecting LMBs to pressure during battery cycling increases performance and stability, helping to solve this lifespan challenge. At higher pressure levels lithium particles are forced to deposit in neat columns, without any porous spaces in between. By contrast, batteries subjected to lower levels of pressure are porous and lithium particles deposit in a disorderly fashion, leaving room for dendrites to grow.

Unregulated lithium growth is the major cause of low Coulombic efficiency, short cycle life and safety hazards for rechargeable Lithium-metal batteries. Strategies that aim to achieve large granular Lithium deposits have been extensively explored, with the goal of achieving Lithium deposits which consist of large Lithium particles that are seamlessly packed on the electrode and can be reversibly deposited and stripped. High density lithium deposition with a columnar structure may be achieved by controlling the uniaxial stack pressure during battery operation. The precise manipulation of lithium deposition and dissolution is a critical step to enable fast charging and a low-temperature operation for lithium-metal batteries.

In an exemplary embodiment, as shown in FIG. 1, the housing 14 further includes a first rigid plate 24 positioned at a first axial end 26 of the battery 12, and a second rigid plate 28 positioned at a second axial end 30 of the battery 12. The first and second rigid plates 24, 28 define the sealed chamber 16 therebetween, and the battery pack 18 is positioned within the sealed chamber 16 between the first and second rigid plates 24, 28. First and second interconnecting members 32, 34 extend axially between and interconnect the first and second rigid plates 24, 28. The first and second interconnecting members 32, 34 extend through holes 36 within the first and second rigid plates 24, 28, wherein the first and second rigid plates 24, 28 are slidably moveable relative to one another axially along the first and second interconnecting members 32, 34.

As shown in FIG. 1, the shape memory alloy member 22 includes a pair of compression springs 22A made from a shape memory alloy. The two most prevalent shape-memory alloys are copper-aluminum-nickel and nickel-titanium (NiTi). Shape memory alloys may also be created by alloying zinc, copper, gold and iron, Although iron-based and copper-based shape memory alloys, such as Fe—Mn—Si, Cu—Zn—Al and Cu—Al—Ni, are commercially available and cheaper than NiTi, NiTi-based shape memory alloys are preferable for most applications due to their stability and practicability as well as their superior thermo-mechanic performance.

Each of the first and second interconnecting members 32, 34 includes a first end 38 and a second end 40. Each of the first and second ends 38, 40 of each of the first and second interconnecting members 32, 34 includes a stop 42 formed thereon adapted to prevent the first and second rigid plates 24, 28 from sliding completely off the first and second interconnecting members 32, 34. The second rigid plate 28 is positioned immediately adjacent the stops 42 formed at the second end 40 of each of the first and second interconnecting members 32, 34. One of the compression springs 22A is positioned between the stop 42 formed at the first end 38 of each of the first and second interconnecting members 32, 34 and the first rigid plate 24. The compression springs 22A bias the first rigid plate 24 toward the second rigid plate 28, as indicated by arrow 44.

The biasing force of the compression springs 22A compresses a volume of the sealed chamber 16, and maintains the pressure within the sealed chamber 16 at an optimum pressure. It has been discovered that higher pressure levels within the sealed chamber 16 force lithium particles to deposit in neat columns, without any porous spaces in between. At lower levels of pressure lithium particles are deposited in a porous and disorderly fashion, leaving room for dendrites to grow. The optimal pressure is the pressure at which satisfactory lithium column formation occurs. Studies have indicated that an optimal pressure for columnar lithium particle formation is roughly 350 kilo Pascal (roughly 3.5 atmospheres). Pressures above this would also work. By way of non-limiting example, in an exemplary embodiment, the optimal pressure within the sealed chamber 16 is roughly 600 kilo Pascal. The optimal pressure within the sealed chamber 16 will be highly dependent on specific features of the battery pack 18 and the type of shape memory ahoy that the shape memory alloy member 22 is made from. Maintaining the uniaxial stack pressure within the sealed chamber 16 during battery operation enables high density lithium deposition with a columnar structure, resulting in precise manipulation of lithium deposition and dissolution, thus enabling fast charging and a low-temperature operation for lithium-metal batteries.

The compression springs 22A are further adapted to automatically allow axial expansion of the volume of the sealed chamber 16 in response to an increase of the pressure within the sealed chamber 16. Thus, increased pressure within the sealed chamber 16 will push against the first and second rigid plates 24, 28 and the first rigid plate 24 will move away from the second rigid plate 28, as shown by arrow 46. As the first rigid plate 24 moves away from the second rigid plate 28, the volume of the sealed chamber 16 is increased, which maintains the pressure within the sealed chamber 16 at the optimal pressure.

The shape memory alloy member 22, the compression springs 22A as shown in FIG. 1, are made from a shape memory alloy material which allows the shape memory alloy member 22 to change shape without imparting high stress to the housing 14. This is accomplished by taking advantage of superelasticity or pseudoelasticity characteristics of the shape memory alloy material.

A pseudoelastic shape memory alloy material behaves like rubber. A pseudoelastic shape memory alloy element can be bent like rubber, with little force, but have strength similar to metals. In the case of pseudoelasticity, the change in the shape of the shape memory alloy is not triggered by increasing the temperature. Pseudoelasticity is an elastic response to an applied stress, caused by a phase transformation between the austenitic and martensitic phases of a crystal. Pseudoelasticity is from the reversible motion of domain boundaries during the phase transformation, rather than just bond stretching or the introduction of defects in the crystal lattice. Thus, a pseudoelastic shape memory alloy material may return to its previous shape after the removal of even relatively high applied strains.

When mechanically loaded, a pseudoelastic or superelastic shape memory alloy deforms reversibly to very high strains, up to 10%, by the creation of a stress-induced phase transformation. When the load is removed, the new phase becomes un-stable and the material regains its original shape. If large stresses are applied, plastic behavior such as detwinning and slip of the martensite will initiate at sites such as grain boundaries or inclusions. If the material is unloaded before plastic deformation occurs, it will revert to austenite once a critical stress for austenite is reached. The material will recover nearly all strain that was induced from the structural change, and for some shape memory alloys this can be strains greater than 10%.

No change in temperature is needed for the alloy to recover its initial shape, this is because the material of a pseudoelastic shape memory alloy has an austenitic microstructure at typical ambient room temperature. Thus, room temperature is the high-temperature phase for the shape memory alloy material. Rather than heating/cooling, the phase transition of the pseudoelastic shape memory alloy is triggered solely as a result of mechanically induced deformation (strain). Removal of the mechanically induced deformation results in the pseudoelastic shape memory alloy returning to its' initial shape. The pseudoelastic effect of the shape memory alloy is only possible because the austenitic phase is stabilized at room temperature.

Figure 2:
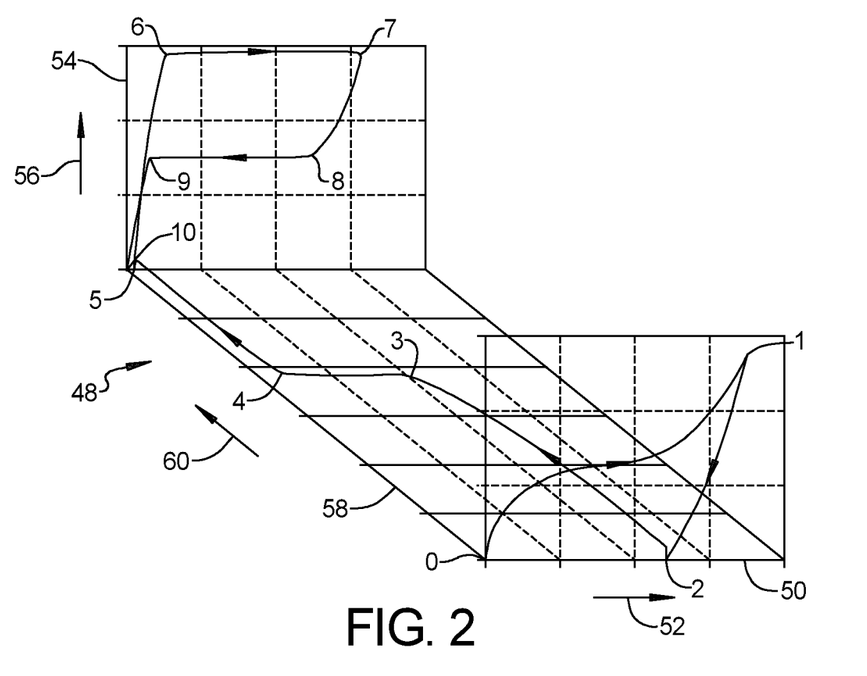
FIG. 2 is a chart illustrating the behavior of shape memory alloys.

Referring to FIG. 2, a chart 48 illustrates the behavior of shape memory alloys. Wherein, an x-axis 50 represents strain, increasing as indicated by arrow 52, a y-axis 54 represents stress, increasing as indicated by arrow 56, and a z-axis 58 represents temperature, increasing as indicated by arrow 60. During normal shape memory effect behavior of the shape memory alloy material, starting at point 0, initially there is no load and no strain. From point 1 to point 2, the shape memory alloy deforms at low temperature (below the high-temp at which austenitic microstructure is stable). From point 3 to point 4, the shape memory alloy transitions to austenite due to the increase in temperature (above the high-temp at which austenitic microstructure is stable). At point 5, the shape memory alloy goes into a superelasticity or pseudoelasticity mode. From point 5 to point 6, the load (pressure within the sealed chamber) increases. From point 6 to point 7, the shape memory alloy is elastically deformed. At point 7, the shape memory alloy transitions to martensite. From point 7 to point 8, the load falls off, and from point 8 to point 9, the shape memory alloy transitions from martensite back to austenite and returns to it's original shape. Starting at point 5 and finishing at point 9, the load building, elastic deformation, transition to martensite, load reduction and transition back to austenite takes place at roughly constant temperature.

The behavior of the shape memory member 22 of the present invention, the compression springs 22A as shown in FIG. 1, is limited to the region between points 6 and 7, elastic deformation. As pressure within the sealed chamber 16 increases, the shape memory member 22, the compression springs 22A, deform and compress, allowing the first rigid plate 24 to move away from the second rigid plate 28, as shown by arrow 46. This movement expands the volume of the sealed chamber 16 and maintains the pressure within the sealed chamber 16 at or near the optimal pressure. The shape memory member 22 does not transition to martensite, but rather remains austenitic and elastic. When the pressure within the sealed chamber 16 drops, the elastic properties of the shape memory member 22 cause the shape memory member 22 to return to its' original shape. Thus, when the pressure within the sealed chamber 16 drops, the compression springs 22A return to their original shape and push the first rigid plate 24 back toward the second rigid plate 28, as indicated by arrow 44. This elastic strain within the compression springs 22A allows the expansion of the volume within the sealed chamber 16 without imparting any stress to the housing 14 and avoiding negative effects of extreme block stress on the lifecycle of the battery 12.

This is an advantage over conventional steel compression springs, which would only continue to compress as the pressure within the sealed chamber 16 increases higher and higher. The force necessary to overcome the biasing of steel compression springs would necessarily be imparted to the housing 14, causing block stress.

Figure 3:
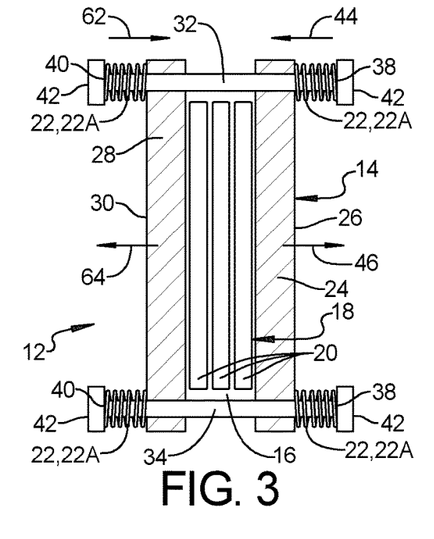
FIG. 3 is a schematic side view of the battery shown in FIG. 1, wherein the battery includes compression springs on both sides of the sealed chamber.

Referring to FIG. 3, in another exemplary embodiment, the shape memory alloy member 22 includes four compression springs 22A made from a shape memory alloy. One of the compression springs 22A is positioned between the stop 42 formed at the first end 38 of each of the first and second interconnecting members 32, 34 and the first rigid plate 24, and one of the compression springs 22A is positioned between the stop 42 formed at the second end 40 of each of the first and second interconnecting members 32, 34 and the second rigid plate 28. The compression springs 22A positioned between the stop 42 formed at the first end 38 of each of the first and second interconnecting members 32, 34 and the first rigid plate 24 bias the first rigid plate 24 toward the second rigid plate 28, as indicated by arrow 44. The compression springs 22A positioned between the stop 42 formed at the second end 40 of each of the first and second interconnecting members 32, 34 and the second rigid plate 28 bias the second rigid plate 28 toward the first rigid plate 24, as indicated by arrow 62.

The biasing force of the compression springs 22A compresses the volume of the sealed chamber 16, and maintains the pressure within the sealed chamber 16 at the optimum pressure, and are further adapted to automatically allow axial expansion of the volume of the sealed chamber 16 in response to an increase of the pressure within the sealed chamber 16. Thus, increased pressure within the sealed chamber 16 will push against the first and second rigid plates 24, 28 and the first rigid plate 24 will move away from the second rigid plate 28, as shown by arrow 46, and the second rigid plate 28 will move away from the first rigid plate 24, as shown by arrow 64. As the first and second rigid plates 24, 28 move away from each other, the volume of the sealed chamber 16 is increased, which maintains the pressure within the sealed chamber 16 at the optimal pressure.

Figure 4:
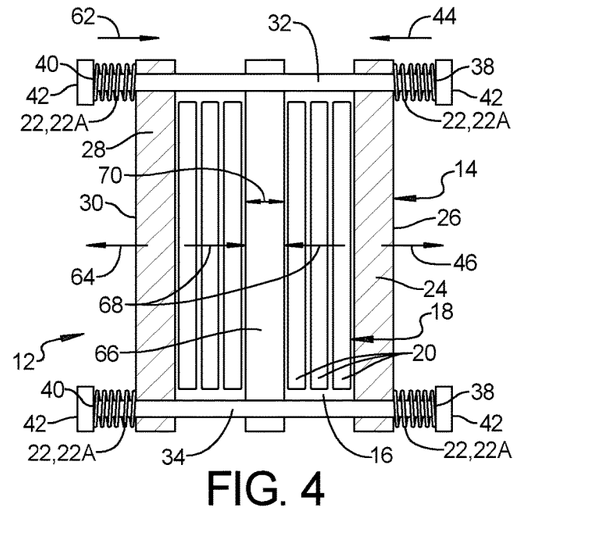
FIG. 4 is a schematic side view of the battery shown in FIG. 3, including a compliant member positioned within the sealed chamber.

Referring to FIG. 4, in another exemplary embodiment, the battery includes a compliant member 66 made from a compressible material positioned within the sealed chamber 16 and axially aligned with the plurality of cells 20 of the battery pack 18. The compliant member 66 is easily compressible, such that when the compression springs 22A positioned between the stop 42 formed at the first end 38 of each of the first and second interconnecting members 32, 34 and the first rigid plate 24 bias the first rigid plate 24 toward the second rigid plate 28, as indicated by arrow 44, and the compression springs 22A positioned between the stop 42 formed at the second end 40 of each of the first and second interconnecting members 32, 34 and the second rigid plate 28 bias the second rigid plate 28 toward the first rigid plate 24, as indicated by arrow 62, the compliant member 66 is squeezed between the cells 20 within the battery pack 18, as indicated by arrows 68. The compliant member 66 compresses to allow the volume within the sealed chamber 16 to reduce.

When the pressure increases within the sealed chamber 16 and pushes against the first and second rigid plates 24, 28, the first rigid plate 24 will move away from the second rigid plate 28, as shown by arrow 46, and the second rigid plate 28 will move away from the first rigid plate 24, as shown by arrow 64. As the first and second rigid plates 24, 28 move away from each other, the volume of the sealed chamber 16 is increased, and the compliant member 66 expands, as indicated by arrow 70. Thus, as the volume within the sealed chamber 16 expands, the compliant member 66 expands to fill the added space to keep the cells 20 of the battery pack 18 in position and prevent the cells 20 from moving within the sealed chamber 16. As shown in FIG. 4, the compliant member 66 may be placed between adjacent cells 20 within the battery pack 18, or may be placed at either axial end 26, 30 of the battery pack 18 between the battery pack 18 and either one of the first and second rigid plates 24, 28.

Figure 5:
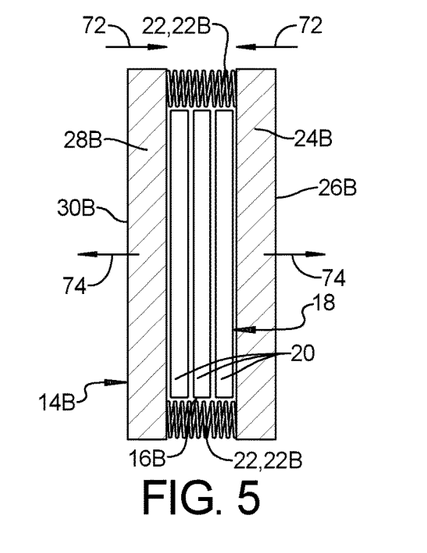
FIG. 5 is a schematic side view of a battery according to an exemplary embodiment, having extension springs made from a shape memory alloy.

Referring to FIG. 5, in another exemplary embodiment, the housing 14B includes a first rigid plate 24B positioned at a first axial end 26B of the battery 12, and a second rigid plate 28B positioned at a second axial end 30B of the battery 12. The first and second rigid plates 24B, 28B define the sealed chamber 16B therebetween. The shape memory alloy member 22 includes first and second extension springs 22B made from a shape memory alloy and extending axially between and interconnecting the first and second rigid plates 24B, 28B, and biasing the first and second rigid plates 24B, 28B toward one another, as shown by arrows 72.

Increased pressure within the sealed chamber 16B will push against the first and second rigid plates 24B, 28B, the first and second extension springs 22B will elastically deform and expand, allowing the first and second rigid plates 24B, 28B to move away from one another, as shown by arrow 74. As the first and second rigid plates 24B, 28B move away from each other, the volume of the sealed chamber 16B is increased, which maintains the pressure within the sealed chamber 16B at the optimal pressure. Likewise, when the pressure within the sealed chamber 16B drops, the first and second expansion springs 22B will retract back to their original shape, pulling the first and second rigid plates 24B, 28B toward one another again, as shown by arrows 72.

Figure 6:
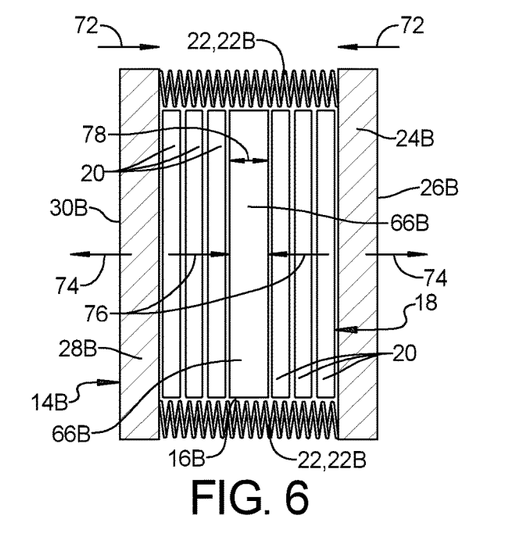
FIG. 6 is a schematic side view of the battery shown in FIG. 5, including a compliant member positioned within the sealed chamber.

Referring to FIG. 6, in another exemplary embodiment, the battery shown in FIG. 5 further includes a compliant member 66B made from a compressible material positioned within the sealed chamber 16B and axially aligned with the plurality of cells 20 of the battery pack 18. The compliant member 66B is easily compressible, such that when the first and second expansion springs 22B bias the first and second rigid plates 24B, 28B toward one another, the compliant member 66B is squeezed between the cells 20 within the battery pack 18, as indicated by arrows 76. The compliant member 66B compresses to allow the volume within the sealed chamber 16B to reduce.

When the pressure increases within the sealed chamber 16B and pushes against the first and second rigid plates 24B, 28B, the first and second rigid plates 24B, 28B move away from one another, as shown by arrows 74, the volume of the sealed chamber is increased, and the compliant member 66B expands, as indicated by arrow 78. Thus, as the volume within the sealed chamber 16B expands, the compliant member 66B expands to fill the added space to keep the cells 20 of the battery pack 18 in position and prevent the cells 20 from moving within the sealed chamber 16B. As shown in FIG. 6, the compliant member 66B may be placed between adjacent cells 20 within the battery pack 18, or may be placed at either axial end 26B, 30B of the housing 14B between the battery pack 18 and either one of the first and second rigid plates 24B, 28B.

Figure 7:
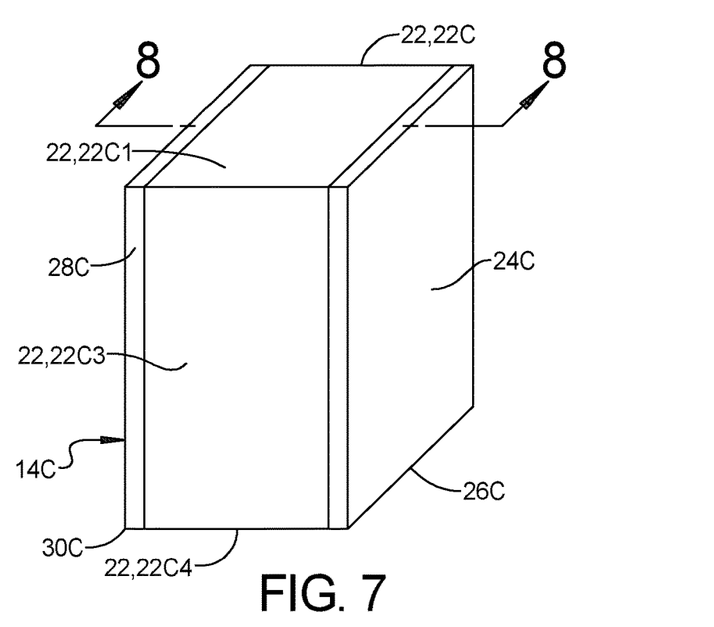
FIG. 7 is a perspective view of a battery housing according to an exemplary embodiment, wherein the housing includes first, second, third, and fourth walls formed from a shape memory alloy.
Figure 8:
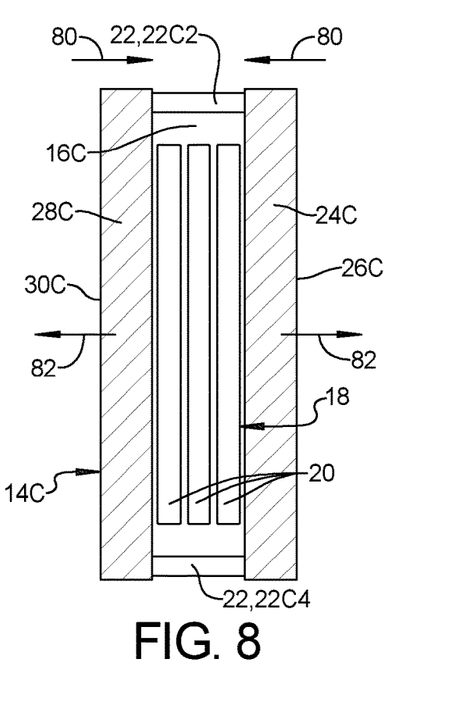
FIG. 8 is schematic side sectional view of the battery housing shown in FIG. 7.

Referring to FIG. 7 and FIG. 8, in another exemplary embodiment, the housing 14C includes a first rigid plate 24C positioned at a first axial end 26C of the battery 12, and a second rigid plate 28C positioned at a second axial end 30C of the battery 12. The shape memory alloy member 22 includes first, second, third and fourth walls, 22C1, 22C2, 22C3, 22C4 unitarily formed from a shape memory alloy and extending axially between and interconnecting the first and second rigid plates 24C, 28C. The first, second, third and fourth walls 22C1, 22C2, 22C3, 22C4 define a hollow open ended box shape, and along with the first and second rigid plates 24C, 28C, define the sealed chamber 16C. The first, second, third and fourth walls 22C1, 22C2, 22C3, 22C4 bias the first and second rigid plates 24C, 28C toward one another, as shown by arrows 80 in FIG. 8.

Increased pressure within the sealed chamber 16C will push against the first and second rigid plates 24C, 28C, the first, second, third and fourth walls 22C1, 22C2, 22C3, 22C4 will elastically deform and expand, allowing the first and second rigid plates 24C, 28C to move away from one another, as shown by arrows 82. As the first and second rigid plates 24C, 28C move away from each other, the volume of the sealed chamber 16C is increased, which maintains the pressure within the sealed chamber 16C at the optimal pressure. Likewise, when the pressure within the sealed chamber 16C drops, the first, second, third and fourth walls 22C1, 22C2, 22C3, 22C4 will retract back to their original shape, pulling the first and second rigid plates 24C, 28C toward one another again, as shown by arrows 80.

Figure 9:
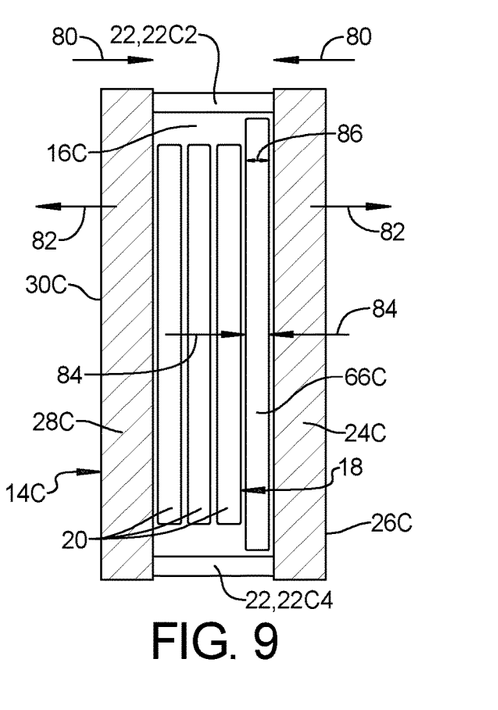
FIG. 9 is a schematic side view of the battery shown in FIG. 7, wherein a compliant member is positioned within the sealed chamber.

Referring to FIG. 9, in another exemplary embodiment, the battery 12 shown in FIG. 8 further includes a compliant member 66C made from a compressible material positioned within the sealed chamber 16C and axially aligned with the plurality of cells 20 of the battery pack 18. The compliant member 66C is easily compressible, such that when the first, second, third and fourth walls 22C1, 22C2, 22C3, 22C4 bias the first and second rigid plates 24C, 28C toward one another, the compliant member 66C is squeezed, as indicated by arrows 84. The compliant member 66C compresses to allow the volume within the sealed chamber 16C to reduce.

When the pressure increases within the sealed chamber 16C and pushes against the first and second rigid plates 24C, 28C, the first and second rigid plates 24C, 28C move away from one another, as shown by arrows 82, the volume of the sealed chamber 16C is increased, and the compliant member 66C expands, as indicated by arrows 86. Thus, as the volume within the sealed chamber 16C expands, the compliant member 66C expands to fill the added space to keep the cells 20 of the battery pack 18 in position and prevent the cells 20 from moving within the sealed chamber 16C. As shown in FIG. 9, the compliant member 66C may be placed at either axial end of the battery pack 18 between the battery pack 18 and either one of the first and second rigid plates 24C, 28C, or may also be placed between adjacent cells 20 within the battery pack 18.

Figures 10, 11, 12, 13, 14:
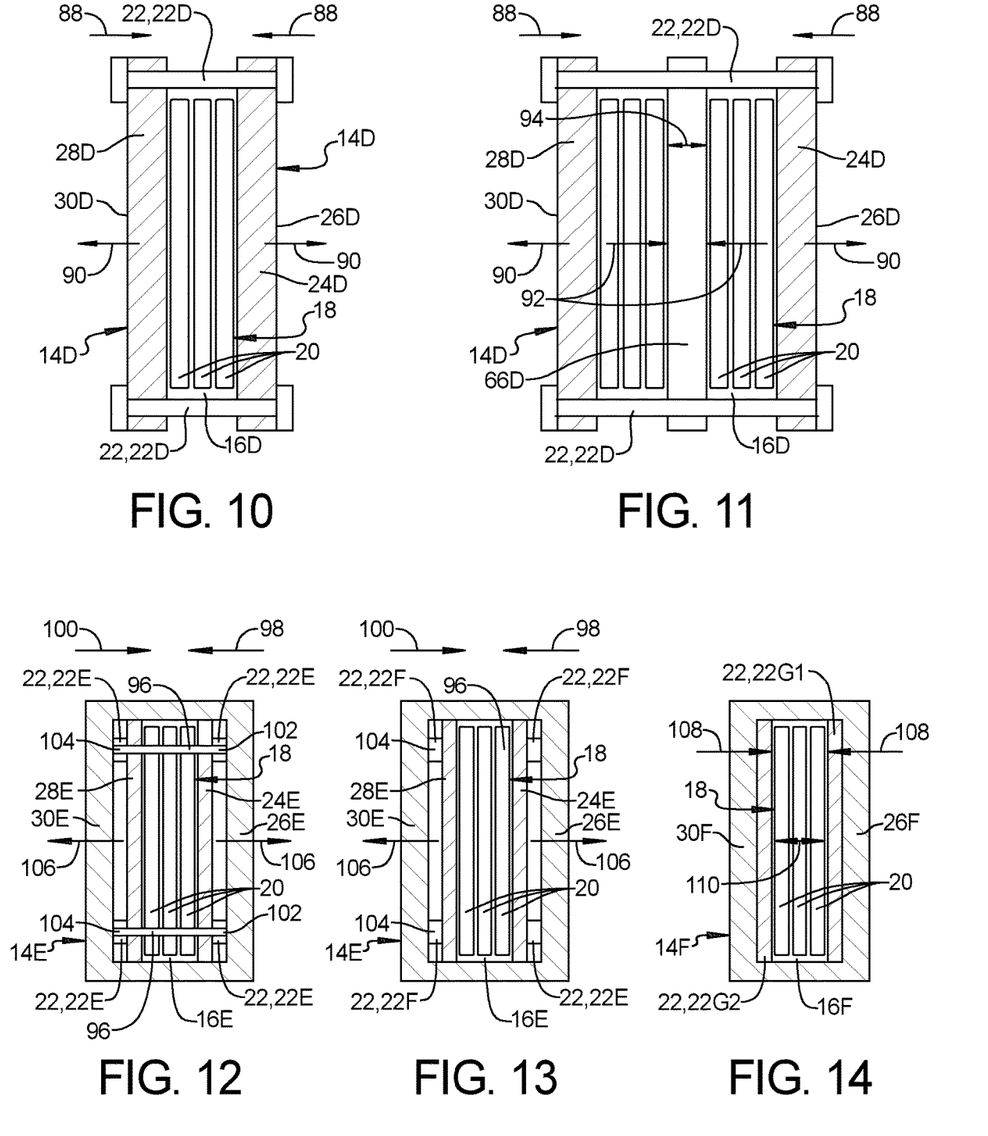
FIG. 10 is a schematic side view of a battery housing in accordance with an exemplary embodiment, including interconnecting rods made from a shape memory alloy.
FIG. 11 is a schematic view of the battery housing shown in FIG. 10, including a compliant member positioned within the sealed chamber.
FIG. 12 is a schematic view of a battery housing in accordance with an exemplary embodiment, including shape memory alloy tubes.
FIG. 13 is a schematic view of a battery housing in accordance with an exemplary embodiment, including shape memory alloy blocks.
FIG. 14 is a schematic view of a battery housing in accordance with an exemplary embodiment, including shape memory alloy compression plates.

Referring to FIG. 10, in another exemplary embodiment, the housing 14D includes a first rigid plate 24D positioned at a first axial end 26D of the battery 12, and a second rigid plate 28D positioned at a second axial end 30D of the battery 12. The first and second rigid plates 24D, 28D define the sealed chamber 16D therebetween. The shape memory alloy member 22 includes first and second interconnecting rods 22D made from a shape memory alloy and extending axially between and interconnecting the first and second rigid plates 24D, 28D, and biasing the first and second rigid plates 24D, 28D toward one another, as shown by arrows 88.

Increased pressure within the sealed chamber 16D will push against the first and second rigid plates 24D, 28D, the first and second interconnecting rods 22D will elastically deform and expand, allowing the first and second rigid plates 24D, 28D to move away from one another, as shown by arrows 90. As the first and second rigid plates 24D, 28D move away from each other, the volume of the sealed chamber 16D is increased, which maintains the pressure within the sealed chamber 16D at the optimal pressure. Likewise, when the pressure within the sealed chamber 16D drops, the first and second interconnecting rods 22D retract back to their original shape, pulling the first and second rigid plates 24D, 28D toward one another again, as shown by arrows 88.

Referring to FIG. 11, in another exemplary embodiment, the battery 12 shown in FIG. 10 further includes a compliant member 66D made from a compressible material positioned within the sealed chamber 16D and axially aligned with the plurality of cells 20 of the battery pack 18. The compliant member 66D is easily compressible, such that when the first and second interconnecting rods 22D bias the first and second rigid plates 24D, 28D toward one another, the compliant member 66D is squeezed between the cells 20 within the battery pack 18, as indicated by arrows 92. The compliant member 66D compresses to allow the volume within the sealed chamber 16D to reduce.

When the pressure increases within the sealed chamber 16D and pushes against the first and second rigid plates 24D, 28D the first and second rigid plates 24D, 28D move away from one another, as shown by arrows 90, the volume of the sealed chamber 16D is increased, and the compliant member 66D expands, as indicated by arrow 94. Thus, as the volume within the sealed chamber 16D expands, the compliant member 66D expands to fill the added space to keep the cells 20 of the battery pack 18 in position and prevent the cells 20 from moving within the sealed chamber 16D. As shown in FIG. 11, the compliant member 66D may be placed between adjacent cells 20 within the battery pack 18, or may be placed at either axial end of the battery pack 18 between the battery pack 18 and either one of the first and second rigid plates 24D, 28D.

Referring to FIG. 12, is still another exemplary embodiment, the housing 14E includes a first rigid plate 24E positioned adjacent a first axial end 26E of the battery 12, and a second rigid plate 28E positioned adjacent a second axial end 30E of the battery 12. The first and second rigid plates 24E, 28E define the sealed chamber 16E therebetween and are independently axially moveable between the first and second axial ends 26E, 30E of the battery 12. As shown, the battery 12 includes first and second alignment members 96 extending axially between the first and second axial ends 26E, 30E of the battery 12. The first and second alignment members 96 extend through the first and second rigid plates 24E, 28E which slide along the first and second alignment members 96 when the first and second rigid plates 24E, 28E move axially between the first and second axial ends 26E, 30E of the battery.

The shape memory alloy member 22 includes at least one compression member 22E made from a shape memory alloy positioned between the first rigid plate 24E and the first axial end 26E of the housing 14E which is adapted to bias the first rigid plate 24E toward the second axial end 30E of the housing 14E, as shown by arrow 98. The shape memory alloy member further includes at least one compression member 22E made from a shape memory alloy positioned between the second rigid plate 28E and the second axial end 30E of the housing 14E which is adapted to bias the second rigid plate 28E toward the first axial end 26E of the housing 14E, as shown by arrow 100.

As shown in FIG. 12, the housing 14E includes four compression members 22E, each compression member 22E being a shape memory alloy tube. One such compression member 22E is positioned on a first distal end 102 of each of the first and second alignment members 96, between the first rigid plate 24E and the first axial end 26E of the housing 14E, and one such compression member 22E is positioned on a second distal end 104 of each of the first and second alignment members 96, between the second rigid plate 28E and the second axial end 30E of the housing 14E.

Increased pressure within the sealed chamber 16E will push against the first and second rigid plates 24E, 28E the shape memory alloy tube compression members 22E will elastically deform and compress, allowing the first and second rigid plates 24E, 28E to move away from one another, as shown by arrows 106. As the first and second rigid plates 24E, 28E move away from each other, the volume of the sealed chamber 16E is increased, which maintains the pressure within the sealed chamber 16E at the optimal pressure. Likewise, when the pressure within the sealed chamber 16E drops, the shape memory alloy tube compression members 22E retract back to their original shape, pushing the first and second rigid plates 24E, 28E toward one another again, as shown by arrows 98, 100.

Referring to FIG. 13, in another exemplary embodiment, the housing 14E does not include alignment members, and the shape memory alloy member 22 includes four compression members 22F, each compression member being a shape memory alloy block. Two compression members 22F are positioned between the first rigid plate 24E and the first axial end 26E of the housing 14E, and two compression members 22F are positioned between the second rigid plate 28E and the second axial end 30E of the housing 14E.

Increased pressure within the sealed chamber 16E will push against the first and second rigid plates 24E, 28E the shape memory alloy compression members 22F will elastically deform and compress, allowing the first and second rigid plates 24E, 28E to move away from one another, as shown by arrows 106. As the first and second rigid plates 24E, 28E move away from each other, the volume of the sealed chamber 16E is increased, which maintains the pressure within the sealed chamber 16E at the optimal pressure. Likewise, when the pressure within the sealed chamber 16E drops, the shape memory alloy compression members 22F retract back to their original shape, pushing the first and second rigid plates 24E, 28E toward one another again, as shown by arrows 98, 100. It should be understood, that the shape memory alloy blocks could be replaced with shape memory alloy compression springs 22A, such as shown in FIG. 1 and FIG. 3, wherein the shape memory alloy compression springs 22A elastically deform and compress when pressure within the sealed chamber 16E increases, and retract back to their original shape when the pressure drops. Additionally, the shape memory alloy member 22 may be a single plate that partially or substantially fills the space between the first rigid plate and the first axial end of the housing and a single plate that partially or substantially fills the space between the second rigid plate and the second axial end of the housing.

Referring to FIG. 14, in another exemplary embodiment, the shape memory alloy member 22 includes a first compression plate 22G1 made from a shape memory alloy positioned at a first axial end 26F of the housing 14F, and a second compression plate 22G2 made from a shape memory alloy positioned at a second axial end 30F of the housing 14F. The first and second compression plates 22G1, 22G2 define the sealed chamber 16F therebetween.

The first and second compression plates 22G1, 22G2, in their neutral shape, compress the volume of the sealed chamber 16F, as indicated by arrows 108, to maintain the pressure within the sealed chamber 16F at the optimal pressure. When the pressure within the sealed chamber 16F increases and pushes against the first and second compression plates 22G1, 22G2, as indicated by arrow 110, the first and second compression plates 22G1, 22G2 elastically deform and compress to allow the volume of the sealed chamber 16F to expand to maintain the pressure at the optimal pressure.

A battery 12 of the present disclosure offers several advantages. These include providing an expandable volume within the sealed chamber 16 of the housing 14 such that pressure within the sealed chamber 16 is maintained at the optimal pressure. This being accomplished passively with shape memory alloys that deform elastically to compress or expand allowing the volume within the sealed chamber 16 to change at constant temperature and without imparting stress onto the battery housing 14.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A lithium-metal battery comprising:
   a housing defining a sealed chamber; and
   a battery pack positioned within the sealed chamber, wherein the housing is adapted to:
   axially compress the sealed chamber to pressurize the sealed chamber to an optimal pressure of at least approximately three hundred and fifty kilopascal at which orderly lithium column formation within the battery pack occurs; and
   automatically allow axial expansion of the sealed chamber in response to an increase of the pressure within the sealed chamber to expand a volume of the sealed chamber and maintain the pressure within the sealed chamber at the optimal pressure.

2. The battery of claim 1, wherein the housing further includes:
   a first rigid plate positioned at a first axial end of the battery, and a second rigid plate positioned at a second axial end of the battery, the first and second rigid plates defining the sealed chamber therebetween;
   first and second interconnecting members extending axially between and interconnecting the first and second rigid plates, wherein the first and second rigid plates are moveable relative to one another axially along the first and second interconnecting members;
   a compression spring positioned between a first end of each of the first and second interconnecting members and the first rigid plate, and adapted to bias the first rigid plate toward the second rigid plate; and a compression spring positioned between a second end of each of the first and second interconnecting members and the second rigid plate, and adapted to bias the second rigid plate toward the first rigid plate.

3. The battery of claim 2, wherein the compression springs positioned between the first end of each of the first and second interconnecting members and the first rigid plate and the compression springs positioned between the second end of each of the first and second interconnecting members and the second rigid plate are made from a shape memory alloy that biases the first and second rigid plates toward one another to axially compress the volume within the sealed chamber and pressurize the sealed chamber to the optimal pressure, and automatically allows axial expansion of the sealed chamber in response to an increase of the pressure within the sealed chamber to expand the volume of the sealed chamber and maintain the pressure within the sealed chamber at the optimal pressure.

4. The battery of claim 1, wherein the housing further includes:
a first rigid plate positioned at a first axial end of the battery, and a second rigid plate positioned at a second axial end of the battery, the first and second rigid plates defining the sealed chamber therebetween; and
first and second extension springs extending axially between and interconnecting the first and second rigid plates, and adapted to bias the first and second rigid plates toward one another.

5. The battery of claim 4, wherein the first and second extension springs are made from a shape memory alloy that biases the first and second rigid plates toward one another to axially compress the volume within the sealed chamber and pressurize the sealed chamber to the optimal pressure, and automatically allows axial expansion of the sealed chamber in response to an increase of the pressure within the sealed chamber to expand the volume of the sealed chamber and maintain the pressure within the sealed chamber at the optimal pressure.

6. The battery of claim 1, wherein the housing includes:
a first rigid plate positioned at a first axial end of the battery, and a second rigid plate positioned at a second axial end of the battery; and
first, second, third and fourth walls extending axially between the first and second rigid plates, the first, second, third and fourth walls and the first and second rigid plates defining the sealed chamber, the first, second, third and fourth walls unitarily formed from a shape memory alloy that biases the first and second rigid plates toward one another to axially compress the volume within the sealed chamber and pressurize the sealed chamber to the optimal pressure, and automatically allows axial movement of the first and second rigid plates away from one another in response to an increase of the pressure within the sealed chamber to expand the volume of the sealed chamber and maintain the pressure within the sealed chamber at the optimal pressure.

7. The battery of claim 1, wherein the housing further includes:
a first rigid plate positioned at a first axial end of the battery, and a second rigid plate positioned at a second axial end of the battery, the first and second rigid plates defining the sealed chamber therebetween; and
first and second interconnecting rods extending axially between and interconnecting the first and second rigid plates, the first and second interconnecting rods being made from a shape memory alloy that biases the first and second rigid plates toward one another to axially compress the volume within the sealed chamber and pressurize the sealed chamber to the optimal pressure, and automatically allows axial movement of the first and second rigid plates away from one another in response to an increase of pressure within the sealed chamber to expand a volume of the sealed chamber and maintain the pressure within the sealed chamber at the optimal pressure.

8. The battery of claim 1, wherein the housing further includes:
a first rigid plate positioned adjacent a first axial end of the battery, and a second rigid plate positioned adjacent a second axial end of the battery, the first and second rigid plates defining the sealed chamber therebetween and being independently axially moveable between the first and second axial ends of the battery; and
at least one compression member positioned between the first rigid plate and the first axial end of the housing and adapted to bias the first rigid plate toward the second axial end of the housing, and at least one compression member positioned between the second rigid plate and the second axial end of the housing and adapted to bias the second rigid plate toward the first axial end of the housing.

9. The battery of claim 8, wherein the at least one compression member positioned between the first rigid plate and the first axial end of the housing and the at least one compression member positioned between the second rigid plate and the second axial end of the housing are made from a shape memory alloy that biases the first and second rigid plates toward one another to axially compress the volume within the sealed chamber and pressurize the sealed chamber to the optimal pressure, and automatically allows axial movement of the first and second rigid plates away from one another in response to an increase of the pressure within the sealed chamber to expand a volume of the sealed chamber and maintain the pressure within the sealed chamber at the optimal pressure; and
each of the at least one compression member positioned between the first rigid plate and the first axial end of the housing and the at least one compression member positioned between the second rigid plate and the second axial end of the housing comprise one of a shape memory alloy tube, a shape memory alloy block, a shape memory alloy compression spring, and a shape memory alloy plate.

10. The battery of claim 1, wherein the housing further includes:
a first compression plate positioned at a first axial end of the battery, and a second compression plate positioned at a second axial end of the battery, the first and second compression plates defining the sealed chamber therebetween; and
the first and second compression plates being made from a shape memory alloy that axially compresses the volume within the sealed chamber and pressurizes the sealed chamber to the optimal pressure, and automatically compresses axially in response to an increase of pressure within the sealed chamber to expand a volume of the sealed chamber and maintain the pressure within the sealed chamber at the optimal pressure.

11. A lithium-metal battery comprising:
a housing defining a sealed chamber;
a battery pack positioned within the sealed chamber; and
a shape memory alloy member that is adapted to axially compress a volume within the sealed chamber to pressurize the sealed chamber to an optimal pressure of at least approximately three hundred and fifty kilopascal at which orderly lithium column formation within the battery pack occurs, and to automatically allow axial expansion of the volume of the sealed chamber in response to an increase of pressure within the sealed chamber to maintain the pressure within the sealed chamber at the optimal pressure.

12. The battery of claim 11, wherein the housing further includes:
   a first rigid plate positioned at a first axial end of the battery, and a second rigid plate positioned at a second axial end of the battery, the first and second rigid plates defining the sealed chamber therebetween; and
   first and second interconnecting members extending axially between and interconnecting the first and second rigid plates, wherein the first and second rigid plates are moveable relative to one another axially along the first and second interconnecting members;
   wherein, the shape memory alloy member includes a compression spring positioned between a first end of each of the first and second interconnecting members and the first rigid plate, and adapted to bias the first rigid plate toward the second rigid plate; and
   the shape memory alloy member includes a compression spring positioned between a second end of each of the first and second interconnecting members and the second rigid plate, and adapted to bias the second rigid plate toward the first rigid plate.

13. The battery of claim 11, wherein the housing further includes:
   a first rigid plate positioned at a first axial end of the battery, and a second rigid plate positioned at a second axial end of the battery, the first and second rigid plates defining the sealed chamber therebetween; and
   wherein, the shape memory alloy member includes first and second extension springs extending axially between and interconnecting the first and second rigid plates, and adapted to bias the first and second rigid plates toward one another.

14. The battery of claim 11, wherein the housing includes:
   a first rigid plate positioned at a first axial end of the battery, and a second rigid plate positioned at a second axial end of the battery; and
   wherein, the shape memory alloy member includes first, second, third and fourth walls, unitarily formed and extending axially between the first and second rigid plates, the first, second, third and fourth walls and the first and second rigid plates defining the sealed chamber.

15. The battery of claim 11, wherein the housing further includes:
   a first rigid plate positioned at a first axial end of the battery, and a second rigid plate positioned at a second axial end of the battery, the first and second rigid plates defining the sealed chamber therebetween; and
   wherein, the shape memory alloy member includes first and second interconnecting rods extending axially between and interconnecting the first and second rigid plates.

16. The battery of claim 11, wherein the housing further includes:
   a first rigid plate positioned adjacent a first axial end of the battery, and a second rigid plate positioned adjacent a second axial end of the battery, the first and second rigid plates defining the sealed chamber therebetween and being independently axially moveable between the first and second axial ends of the battery; and
   wherein, the shape memory alloy member includes at least one compression member positioned between the first rigid plate and the first axial end of the housing and adapted to bias the first rigid plate toward the second axial end of the housing, and at least one compression member positioned between the second rigid plate and the second axial end of the housing and adapted to bias the second rigid plate toward the first axial end of the housing.

17. The battery of claim 16, wherein each of the at least one compression member positioned between the first rigid plate and the first axial end of the housing and the at least one compression member positioned between the second rigid plate and the second axial end of the housing comprise one of a shape memory alloy tube, a shape memory alloy block, a shape memory alloy compression spring, and a shape memory alloy plate.

18. The battery of claim 11, wherein the shape memory alloy member includes a first compression plate positioned at a first axial end of the battery, and a second compression plate positioned at a second axial end of the battery, the first and second compression plates defining the sealed chamber therebetween.

19. The battery of claim 1, wherein the optimal pressure at which orderly lithium column formation within the battery pack occurs is approximately six hundred kilopascal.

20. The battery of claim 11, wherein the optimal pressure at which orderly lithium column formation within the battery pack occurs is approximately six hundred kilopascal.

* * * * *